June 29, 1926.
A. N. TEBBS
1,590,332
HYDRAULIC CLUTCH
Filed Jan. 2, 1925
2 Sheets-Sheet 1
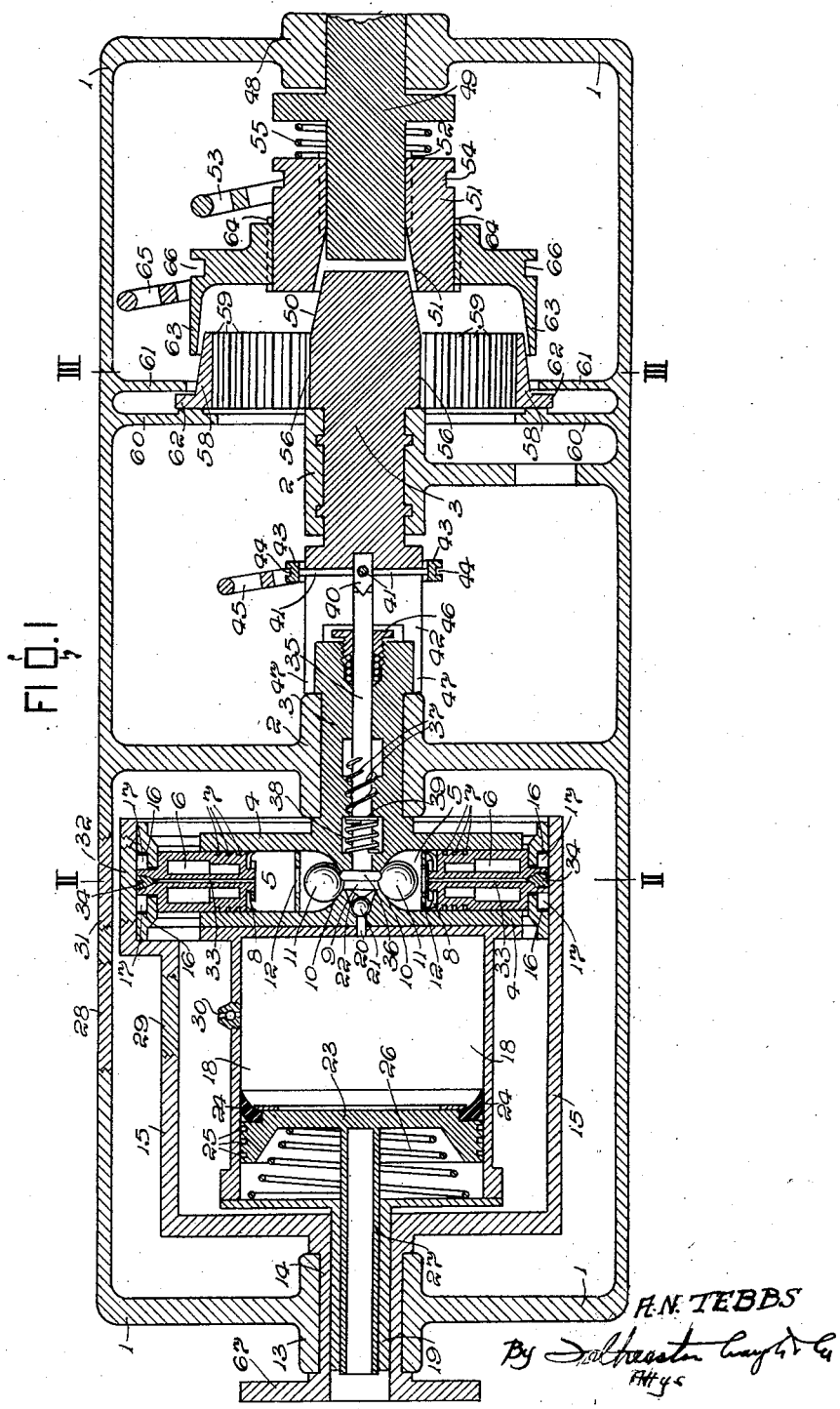

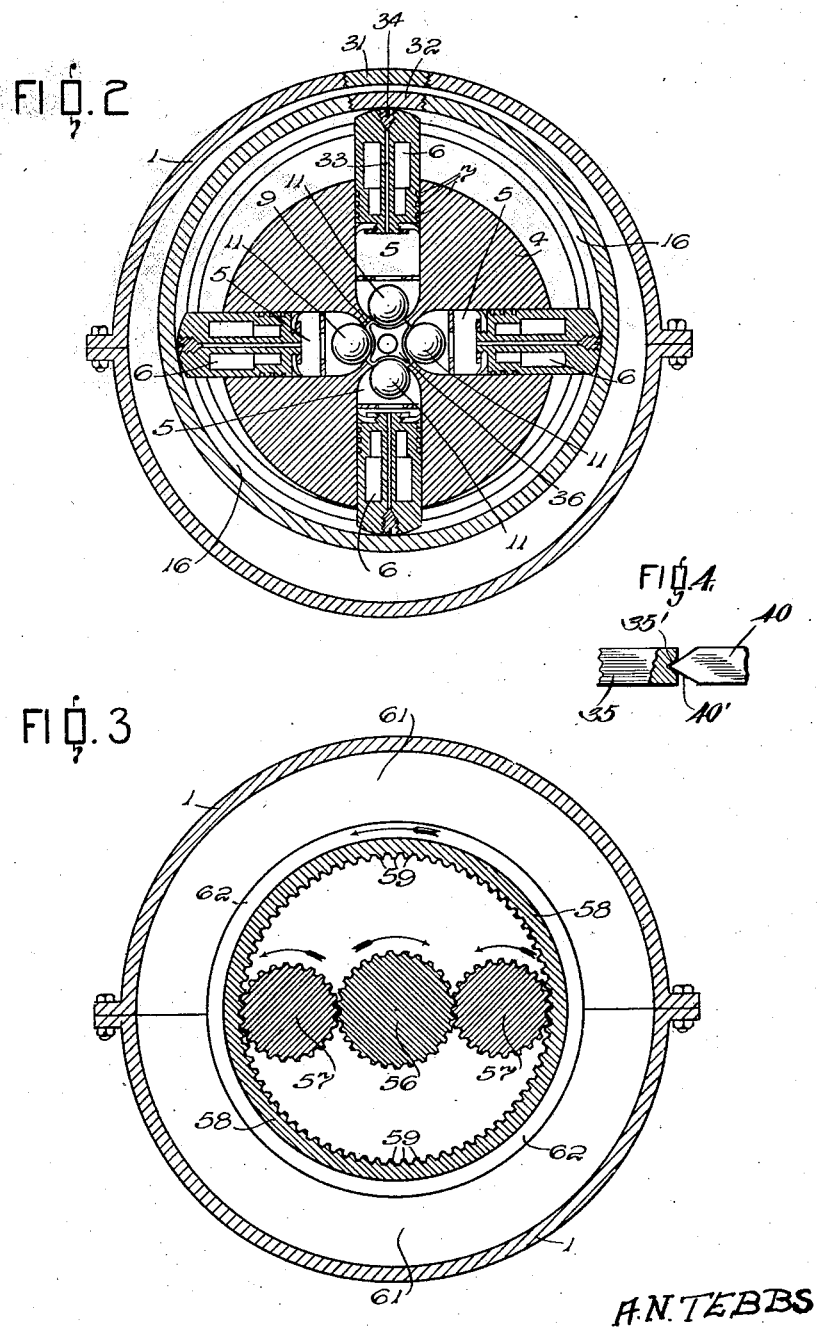

Patented June 29, 1926.

1,590,332

UNITED STATES PATENT OFFICE.

ARTHUR NORMAN TEBBS, OF FENDALTON, CHRISTCHURCH, NEW ZEALAND.

HYDRAULIC CLUTCH.

Application filed January 2, 1925, Serial No. 241, and in New Zealand January 19, 1924.

This invention relates to apparatus for providing a variable gear ratio between a driving and a driven shaft, as for instance between the engine shaft and the transmission shaft of a motor car and refers to that type of apparatus wherein the said driving and driven shafts are provided with elements which so co-operate that a rotation of the driving shaft relative to the driven shaft necessarily involves the displacement of a body of liquid constituting the power transmitting medium between said driving and driven shafts. The said arrangement is such that by intercepting or throttling the said displacement the gear ratio of the said shafts may be varied to any desired degree from unity when such displacement is positively intercepted to a maximum differentiation when the said intercepting or throttling means are withdrawn to the fullest extent.

It is the object of the present invention to provide an apparatus or hydraulic clutch of this type of novel and efficient construction, capable of being easily controlled and maintained in effective working order while a further object of the invention is to provide a construction whereby there is incorporated as a single unit with a hydraulic clutch, mechanism whereby the direction of rotation of the drive upon the load may be reversed.

In order that the nature of the invention and its construction may be clearly understood, it will now be fully described and explained with reference to the accompanying drawings, in which:—

Fig. 1 is a longitudinal section through a gear constructed in accordance with the present invention;

Fig. 2 is a cross-section of the same through the line II—II, Fig. 1, and,

Fig. 3 is a cross-section through the line III—III, Fig. 1.

Figure 4 is a fragmentary detailed view.

1 is a frame by means of which the parts hereinafter described are mounted and which frame preferably takes the form of a dust-proof casing, as here shown to protect the enclosed mechanism.

Journalled within bearings 2 in the said frame is a shaft 3 upon one end of which is fixed to rotate therewith a body 4 containing a plurality of cylinders or bores 5 disposed equidistantly around the said shaft and with their axes radial therewith or substantially so.

Each of the said cylinders is provided with a piston 6 adapted to reciprocate liquid-tight therein, for which purpose such pistons may be provided with appropriate packing means such as piston-rings 7 and cup-leathers 8.

The inner ends of the cylinders 5 are inter-connected by means of a bore 9 arranged axially in the body 4 and in the inner end of each cylinder at the point so communicating with the bore 9 is provided a seating 10 with which a ball 11, loosely arranged within such cylinder, is adapted to close and thus intercept communication between such cylinder and the bore 9, a suitable cage as 12 being provided in each cylinder to prevent the ball from coming in contact with the piston.

In a bearing 13 in the frame 1 is journalled a shaft 14 upon the inner end of which is fixed to rotate therewith a hollow member 15 which may be a drum or spider which extends towards the body 4 and carries an annular race 16 which is eccentric with the aforementioned shaft 3.

The outer ends of the pistons 6 are provided with lugs 17 or other suitable formations to be slidably engaged by the race 16, in order that a rotation of one of the said shafts relative to the other shaft may cause the pistons to reciprocate within their cylinders.

The portions of the cylinders to the inner sides of their pistons and the communicating bore 9 will be completely filled with liquid. In order to maintain this condition there is provided a reservoir 18 attached to the body 4 to extend within the drum or spider 15 and provided at its other or reverse end with a spindle 19 rotatably received within a bore formed in the aforementioned shaft 14 and concentrically therewith to permit of the reservoir rotating with the body 4 independently of the shaft 14.

The reservoir 18 is adapted to contain a supply of the said liquid which is in communication with the bore 9 through a passage 20 having a non-return valve adapted to prevent a return of such liquid from the bore to the reservoir. In its preferred form as here shown the said non-return valve consists of a ball 21 adapted to seat against the end of the said communicating passage adjacent to the bore 9, a suitable spring as 22 being preferably provided to resiliently hold the said ball in place upon its said seating.

In order to maintain the liquid within the reservoir 18 at a suitable degree of pressure there is provided within such reservoir a plunger 23 slidable liquid-tight therein and for which purpose such plunger will be provided with appropriate packing means such as a cup-leather 24 and piston-rings 25. The arrangement is such that the said liquid will be contained within the portion of the reservoir between the plunger and the communicating passage 20 and the plunger is controlled by a spring 26 interposed in compression between the other or reverse end of the reservoir and the adjacent side of the plunger thereby forcing the latter against the said liquid. For the purpose of guiding it in its said sliding movement the plunger is preferably provided with a stem 27 slidable in a bore formed in the reservoir spindle 19.

For the purpose of enabling the liquid to be placed in the reservoir there will be provided at the required position in the upper side of the casing 1 a removable filler-cap 28 and with which is adapted to coincide at a stage in the revolution of the drum 15 a filler-cap 29 removably arranged in such drum, thereby giving access for the insertion of a grease-gun or other appliance whereby liquid may be injected into the reservoir through a non-return inlet or filler-cap 30 provided in such reservoir and adapted at one stage in the rotation of the latter to be in co-incidence with the said filler-caps.

For the purpose of withdrawing any air that might find its way into and form an air-lock in the cylinders or in their communicating bore 9 similarly co-inciding filler-caps 31 and 32 are provided in the casing 1 and in the annular race respectively giving access to any one of passages 33 formed axially through the pistons 6 and each adapted to be closed by means of a screw-plug 34 or other means arranged in the outer ends of the said pistons.

To control the unseating of the balls 11 there is provided in the shaft 3 an axial bore in which is slidably received a rod 35 one end of which projects within the bore 9 and is provided with a substantially-star-shaped formation of cam 36 having radial projections corresponding in number with the balls 11 and adapted when such formation is turned axially to engage and unseat the said balls. This turning is accomplished by providing the rod 35 with one or more threads or spirals 37 received nut-wise in suitable internal threads in the shaft 3. Thus a longitudinal movement of the rod 35 will provide also an axial turning of such rod in relation to the shaft 3. The rod is normally maintained by means of a spring 38 in that position in which its cam exercises no control upon the balls 11, the said spring being housed in a recess in the shaft 3 and being arranged in compression between an abutment or shoulder constituted by the end of the said recess nearest to the cam and a collar or projection 39 upon the said rod.

The rod is adapted to be advanced manually against the tendency of its said spring for the purpose of causing its cam to unseat the balls as already explained. In the preferred form of the construction as here shown, by providing a rod or member 40 slidable within the shaft 3, end for end with the rod the said member 40 being provided with a centre-point 40' adapted to engage a corresponding recess 35' in the adjacent end of the rod 35. The member 40 is provided with radial arms 41 slidable in slots 42 formed longitudinally in the shaft 3 and which arms terminate at their outer ends in a rim 43 freely encircling the said shaft and having formed therein a peripheral groove 44 in which a forked lever 45 engages, such lever being operable manually through any appropriate means.

To prevent leakage of liquid between the rod 35 and its receiving bore in the shaft 3 the latter is provided with a suitable packing gland 46 to surround the said rod. In order that this gland may be arranged the shaft 3 is made in two portions as here shown and connected together end-for-end by splines 47 or other appropriate coupling means.

In order to enable the direction of the drive to be reversed there is provided and journalled in a bearing 48 in the frame 1 a third shaft 49 arranged end-for-end with the shaft 3 and at the opposite end of the latter to that at which the body 4 is carried, the said shafts 3 and 49 being adapted at the will of the operator to rotate either in the same or in opposite directions.

When a direct drive between the two shafts 3 and 49 in the same direction is desired such shafts are connected together by means of a cone-clutch of known design, one member 50 of which is formed upon the end of the shaft 3, while the other member 51 of such clutch is slidable upon the shaft 49 but is held from rotation thereon by means of feathers 52 or other appropriate means. The clutch-member 51 is manipulable by the operator for the purpose of clutching and de-clutching the shafts, such manipulation being effected by any appropriate means, such for example as a forked lever 53 engaging in a peripheral groove 54 as customary in clutches of this type. There is preferably provided also a spring 55 tending to carry into and maintain the member 51 in engagement with the member 50.

Upon the portion of the shaft 3 adjacent to the clutch-member 50 there is formed or otherwise provided a pinion 56 which meshes with a pair of pinions 57 (Fig. 3) arranged one on either side of the pinion 56, the said pinions 57 being provided with suitable spindles journalled in bearings provided in the frame 1. Arranged concentrically with the shaft 3 and encircling the two pinions 57 is an annular member 58 whose internal periphery is formed with gear-teeth 59 which mesh with the pinions 57. The arrangement is such that by reason of the intermeshing of its teeth with those of the pinions the said annular member will float upon or be supported by such pinions and will thereby be caused to rotate axially in the opposite direction to the shaft 3, as indicated by the arrows, Fig. 3. Suitable means are provided for restraining the annular member from movement longitudinally with its axis and which means may conveniently consist as here shown of a pair of annular flanges 60 and 61 provided upon the interior of the frame 1 and projecting inwardly to lie one to either side of a peripheral flange 62 upon the annular member. If thought necessary or desirable however suitable ball or other bearings may be inserted between the flange 62 and either or both of the flanges 60 and 61.

Upon the external periphery of the annular member 58 is formed or provided one member of a cone-clutch also of known design, and the other member of which 63 is slidably mounted upon the aforementioned clutch-member 51 but is held from rotation thereon by feathers 64 or other suitable means. The arrangement is such therefore that the clutch member 63 will be non-rotatably connected with the shaft 49 and consequently when such clutch-member is caused to engage the annular member 58 the shafts 3 and 49 wil lthereby be connected to rotate in opposite directions. Suitable means such for instance as a forked lever 65 engaging with a peripheral groove 66 in the clutch-member 63 are employed for manipulating the latter to cause it to clutch and de-clutch with the annular member.

In operation the shaft 14 may be regarded as the driving shaft and connected, as by a coupling-flange 67 or other means, to a source of power, such for instance as the crank-shaft of the engine of a motor-car, while the shaft 3 may be arranged to connect through the shaft 49 with the load, as for instance by making the latter the transmission-shaft of a car, or connecting such shaft with the transmission.

When the shaft 14 is rotated carrying with it the drum or spider 15 and race 16, the shaft 3 and its member 4 will tend to remain stationary so that the pistons 6, by reason of their connections 17 with the eccentric race, will be caused to reciprocate within their cylinders 5.

Owing to the fact that the said cylinders are completely filled with liquid, it will be understood that such reciprocation involves a displacement of the fluid to and from the cylinders. Consequently if the balls 11 are completely closed upon their seats, as here shown, they will effectually prevent the liquid from being expressed from any such cylinders. The liquid, being thus retained in the cylinders, will oppose inward movements therein of the pistons which will therefore be prevented from reciprocation, thereby causing such pistons, together with the member 4 and shaft 3 to rotate as one piece with the shaft 14.

If however the rod 53 is advanced against the tendency of its spring 38, as by the manipulation of the lever 45, the action of the spirals 37 will cause such rod to turn axially thereby turning also the cam 36 and so placing the latter in such a position that its projections will lift the balls 11 from their seats to a more or less degree according to the extent of the axial movement of the cam. If therefore the balls are lifted to such an extent as to permit of a limited displacement the pistons will thereby be permitted to reciprocate at the rate allowed by such displacement and consequently the shaft 3 will be caused to rotate at a relatively slower speed than the shaft 14, such difference in the speeds of the shafts resulting in a corresponding gearing effect between the said shafts due to increased speed of engine.

If the turning of the cam is continued so as to produce a wider opening of the balls the relative speed of the shaft 3 will be further reduced, until, if such opening is of sufficient area to permit of the full necessary displacement, such shaft 3 may be permitted to remain stationary while the shaft 14 revolves.

In this manner by advancing or returning the rod 35 the gear ratio between the shafts 14 and 3 may be varied to any desired degree.

In the event of any loss of the liquid from the cylinders occurring, as through leakage past the pistons, such deficiency will be made good automatically from the liquid contained in the reservoir 18, the plunger 23 being caused by its spring 26 to express such liquid through the passage 20 past the ball 21 into the bore 9.

When it is desired that the load connected with the shaft 49 shall be driven in the same direction as the shafts 14 and 3 the clutch-member 51 will be caused, as by the manipulation of the lever 53, to engage with the clutch-member 50, or such member 51 may be permitted to so engage under action of its spring 55 thereby causing the shafts 3 and 49 to revolve together as one piece.

When it is desired that the load shall be driven in the reverse direction to that of the rotation of the shafts 3 and 14 however the said clutch-member 51 will be disengaged and the clutch-member 63 will, as by the manipulation of the lever 65, be caused to engage its corresponding clutch-formation upon the annular member 58, thereby causing the shaft 49 to revolve with such annular member in the opposite direction to that of the rotation of the shaft 3.

The clutch-members 51 and 63 will of course be brought into and out of engagement with their fellows alternately.

From the foregoing description and explanation it will be understood that the device will be similarly operative if applied in the opposite way to that described. That is to say the source of power may be applied to the shaft 49 and the load to the shaft 14.

I claim:—

1. A hydraulic clutch comprising a frame, a driving and a driven shaft journalled therein, a body fixed upon one of said shafts to rotate therewith, a series of cylinders formed in said body with their axes substantially radial with said shaft, a like series of pistons reciprocal one within each of said cylinders, means carried upon the other said shaft and co-operating with said pistons to reciprocate the later within their cylinders when one of said shafts is rotated relative to the other said shaft, an axial bore in said body, an opening in the inner end of each cylinder communicating with said bore, a ball in the inner end of each cylinder to seat upon said opening thereby to intercept said communication, and means located within said bore and operable manually to unseat said balls.

2. A hydraulic clutch as defined in claim 1 characterized in that said means for unseating the balls consists of a substantially star-shaped cam turnable axially in said bore thereby to cause the radial projections of said cam to engage said balls.

3. A hydraulic clutch as defined in claim 1 in which the last mentioned means comprises a rod slidable longitudinally in an axial bore in the cylinder carrying shaft, said rod being provided with a spiral portion engaging a complementary portion formed in said shaft to provide for longitudinal and rotary movement of the rod and a star shaped cam fixed to said rod with the radial projections of the cam arranged to engage and unseat said balls.

4. A hydraulic clutch as recited in claim 1 in which the last mentioned means comprises a rod slidable longitudinally in an axial bore in the cylinder carrying shaft, said rod being provided with a spiral portion engaging a complementary portion formed in said shaft to provide for longitudinal and rotary movement of the rod, a star shaped cam fixed to said rod with the radial projections of the cam arranged to engage and unseat said balls, a spring confined between abutments carried by said shaft and rod and tending to move the rod longitudinally in one direction and manually operable means connected with said rod for moving the same in the opposite direction and against the resistance of said spring.

5. A hydraulic clutch comprising a frame, a driving and a driven shaft journalled therein, a body fixed upon one of said shafts to rotate therewith, a series of cylinders formed in said body with their axes substantially radial with said shaft, a like series of pistons reciprocal one within each of said cylinders, means carried upon the other said shaft and co-operating with said pistons to reciprocate the latter within their cylinders when one of said shafts is rotated relative to the other said shaft, an axial bore in said body, an opening in the inner end of each cylinder communicating with said bore, a ball in the inner end of each cylinder to seat upon said opening thereby to intercept said communication, a rod slidable longitudinally in an axial bore in the cylinder carrying shaft, a star shaped cam fixed to the rod near one end thereof and arranged so that the radial projections of the cam are disposed to engage and unseat said balls, said rod being provided with a spiral portion engaging a complementary portion of the shaft to cause rotation of the rod during longitudinal movement thereof, a member slidable in said shaft end for end with said rod and rotatably engaging the end of the rod remote from said star shaped cam, radial arms carried by said member and extending through longitudinal slots in said shaft and a grooved rim encircling said shaft and secured to the outer extremities of said arms.

6. A hydraulic clutch comprising a frame, a driving and a driven shaft journalled therein, a body fixed upon one of said shafts to rotate therewith, a series of cylinders formed in said body with their axes substantially radial with said shaft, a like series of pistons reciprocal one within each of said cylinders, means carried by the other said shaft and co-operating with said pistons to reciprocate the latter within their cylinders when one of said shafts is rotated relative to the other said shaft, an axial bore in said body communicating with openings at the inner ends of said cylinders, ball valves contained in said cylinders and controlling the said openings, a star shaped cam rotatably mounted in said bore with the projections thereof arranged to engage and unseat said balls when the cam is moved to a predetermined position, a liquid-containing reservoir carried by said body, a passage communicating between said reservoir and said bore and a spring-controlled plunger in said reservoir tending to express liquid therefrom to said bore.

7. A hydraulic clutch comprising a frame, a driving and a driven shaft journalled therein, a body fixed upon one of said shafts to rotate therewith, a series of cylinders formed in said body with their axes substantially radial with said shaft, a like series of pistons reciprocal one within each cylinder, an axial bore in said body communicating with the inner ends of said cylinders, manipulable means governing said communication, a hollow member fixed upon the other said shaft and projecting therefrom towards said body, means carried upon said hollow member and co-operating with said pistons thereby to reciprocate the latter within their cylinders when one of said shafts is rotated relative to the other said shaft, a liquid-containing reservoir carried upon said body and projecting freely within said hollow member, a passage communicating between said reservoir and said axial bore, and a spring controlled plunger in said reservoir tending to express liquid therefrom through said passage to said axial bore.

8. A hydraulic clutch as defined in claim 7 characterized in that said reservoir is provided with a spindle rotatable in an axial bore in said hollow-member-carrying shaft.

9. A hydraulic clutch as defined in claim 7 in which said reservoir is provided with a spindle rotatable in an axial bore formed in the hollow-member carrying shaft and a stem carried by the plunger of the reservoir and slidable in an axial bore formed in said spindle.

In witness whereof, I have hereunto set my hand.

ARTHUR NORMAN TEBBS.